US007003548B1

(12) United States Patent
Barck et al.

(10) Patent No.: US 7,003,548 B1
(45) Date of Patent: Feb. 21, 2006

(54) METHOD AND APPARATUS FOR DEVELOPING AND CHECKING TECHNICAL CONFIGURATIONS OF A PRODUCT

(75) Inventors: David Barck, Minneapolis, MN (US); Forrest Bentley, Minneapolis, MN (US); Kevin Hennelly, Minneapolis, MN (US)

(73) Assignee: GELCO Corporation, Eden Prairie, MN (US)

( * ) Notice: Subject to any disclaimer, the term of this patent is extended or adjusted under 35 U.S.C. 154(b) by 0 days.

(21) Appl. No.: 09/280,609

(22) Filed: Mar. 29, 1999

(51) Int. Cl.
   *G06F 15/16* (2006.01)
(52) U.S. Cl. .................. 709/203; 709/220; 705/27
(58) Field of Classification Search ........... 709/220, 709/228, 201, 203; 340/825; 395/712; 710/104; 713/1, 100; 705/26
   See application file for complete search history.

(56) References Cited

U.S. PATENT DOCUMENTS

| | | | |
|---|---|---|---|
| 4,459,663 A | 7/1984 | Dye | 364/200 |
| 5,204,821 A | 4/1993 | Inui et al. | 364/468 |
| 5,260,866 A | 11/1993 | Lisinski et al. | 364/401 |
| 5,307,260 A | 4/1994 | Watanabe et al. | 364/401 |
| 5,406,475 A | 4/1995 | Kouchi et al. | 364/401 |
| 5,644,725 A | 7/1997 | Schmerer | 364/401 |
| 5,710,887 A | 1/1998 | Chelliah et al. | 395/226 |
| 5,712,989 A | 1/1998 | Johnson et al. | 395/222 |
| 5,727,164 A | 3/1998 | Kaye et al. | 395/228 |
| 5,771,172 A | 6/1998 | Yamamoto et al. | 364/468.1 |
| 5,774,873 A | 6/1998 | Berent et al. | 705/26 |
| 5,802,497 A | 9/1998 | Manasse | 705/27 |
| 5,826,242 A | 10/1998 | Montulli | 705/27 |
| 5,844,554 A * | 12/1998 | Geller et al. | |
| 5,870,719 A * | 2/1999 | Maritzen et al. | |
| 5,926,817 A * | 7/1999 | Christeson et al. | |
| 5,935,209 A * | 8/1999 | Budhraja et al. | |
| 5,966,697 A * | 10/1999 | Fergerson et al. | |
| 5,999,948 A * | 12/1999 | Nelson et al. | |
| 6,026,431 A * | 2/2000 | Hinrichs et al. | |
| 6,029,143 A * | 2/2000 | Mosher et al. | |
| 6,043,815 A * | 3/2000 | Simonoff et al. | |
| 6,049,822 A * | 4/2000 | Mittal | |
| 6,054,983 A * | 4/2000 | Simonoff et al. | |
| 6,064,982 A * | 5/2000 | Puri | |
| 6,085,198 A * | 7/2000 | Skinner et al. | |
| 6,125,352 A * | 9/2000 | Franklin et al. | |
| 6,125,363 A * | 9/2000 | Buzzeo et al. | |
| 6,161,125 A * | 12/2000 | Traversat et al. | 709/203 |
| 6,185,600 B1 * | 2/2001 | Spence et al. | 709/203 |
| 6,233,609 B1 * | 5/2001 | Mittal | |
| 6,286,038 B1 * | 9/2001 | Reichmeyer et al. | 709/220 |
| 6,292,827 B1 * | 9/2001 | Raz | |
| 6,300,948 B1 * | 10/2001 | Geller et al. | |
| 6,409,602 B1 * | 6/2002 | Wiltshire et al. | |

(Continued)

*Primary Examiner*—Andrew Caldwell
*Assistant Examiner*—Stephan Willett
(74) *Attorney, Agent, or Firm*—Dorsey & Whitney LLP

(57) ABSTRACT

A method for developing a technical configuration and electronically delivering to a client from a server an order report for the technical configuration. The method comprises interactively eliciting and electronically receiving from a user on the client a desired technical configuration, wherein the act of interactively eliciting and electronically receiving comprises providing to the client from the server a limited configuration engine and performing a first, limited check on the viability of the desired technical configuration on the client using the limited configuration engine; performing a second, final check on the viability of the desired technical configuration using a full configuration engine on the server; and, in response to the final check, preparing and outputting on the client an electronic order report.

27 Claims, 10 Drawing Sheets

U.S. PATENT DOCUMENTS

| | | | |
|---|---|---|---|
| 6,438,559 B1 * | 8/2002 | White et al. | |
| 6,460,077 B1 * | 10/2002 | Mittal | 709/203 |
| 6,463,459 B1 * | 10/2002 | Orr et al. | 709/203 |
| 6,505,204 B1 * | 1/2003 | Fanjoy | |
| 6,513,045 B1 * | 1/2003 | Casey et al. | |
| 6,522,334 B1 * | 2/2003 | Schauser | |
| 6,535,913 B1 * | 3/2003 | Mittal et al. | 709/203 |
| 6,609,108 B1 * | 8/2003 | Pulliam et al. | 705/27 |
| 6,654,726 B1 * | 11/2003 | Hanzek | 705/26 |
| 6,725,257 B1 * | 4/2004 | Cansler et al. | 709/219 |

* cited by examiner

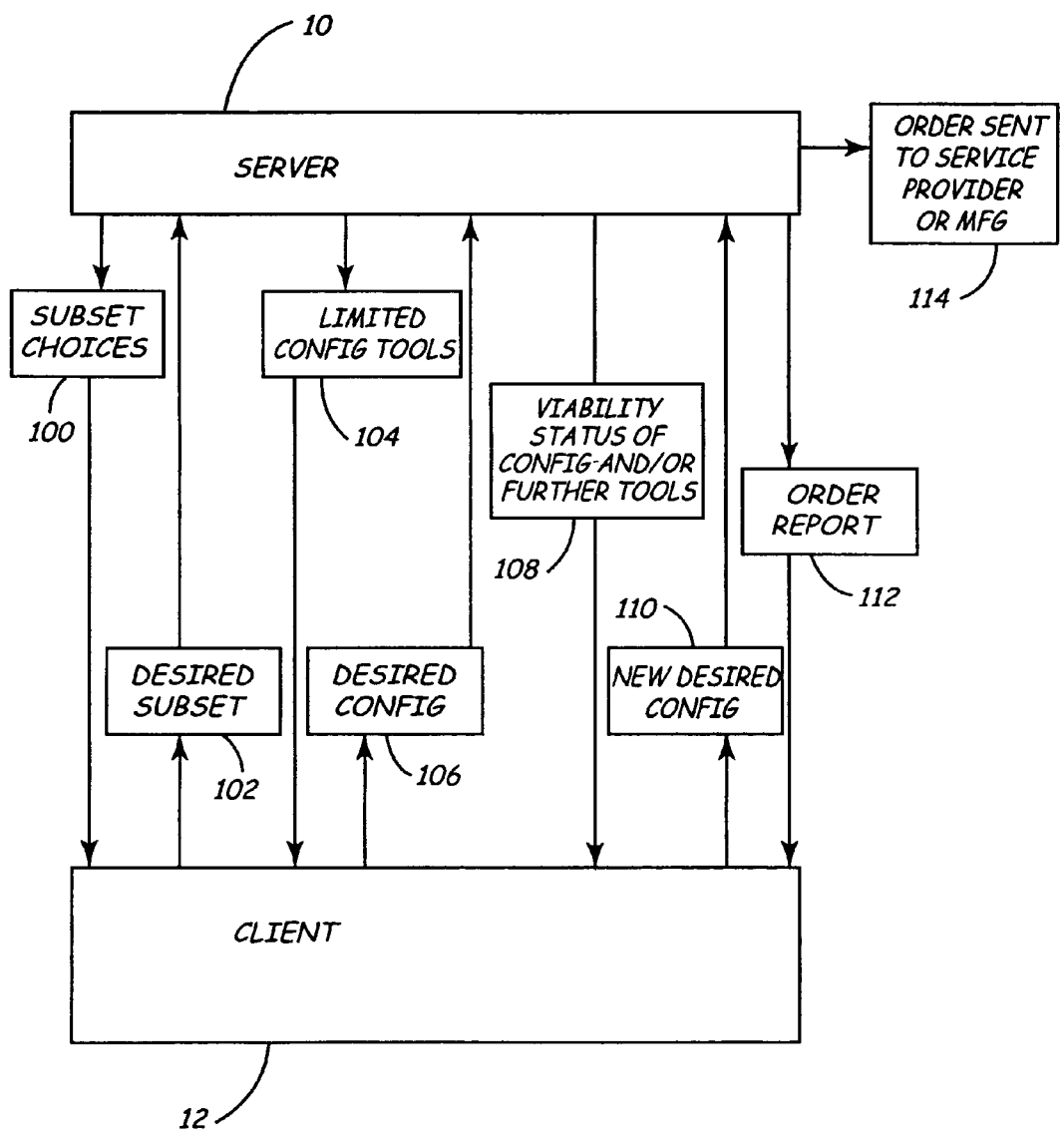

FIG. 10

| Country: USA  Fleet: 007777 | GE Capital Fleet Services  *Vehicle Ordering System* |
|---|---|
| Config - Percent Complete:  [ 75% ] | *Vehicle Options*  1999 Chevrolet CK20953 C/K 2500 Ext Cab Fleetside 8' Box Pickup |

Help
Main Menu

Std. Equipment
Vehicle Details

☑ Invoice
☐ MSRP
☐ View Package Details
Price

Previous   Next

500 ⟶

Body Styles
ⓑ  ☑ E63  Body Code: 8' Fleetside                                         N/C

Engines (Req'd)
☐ L31  Engine: Vortec 5700 V8 (350 Cu In) SFI                              N/C
☐ L29  Engine: Vortec 7400 V8 (454 Cu In) SFI                              $510
☐ ☑ L65  Engine: 6.5 Liter V8 Turbo (400 Cu In) Diesel                    $2431

Transmission (Req'd)
☑ MW3  Transmission: 5-Speed Manual Deep Low                              N/C
        W/Overdrive
☐ MT1  Transmission: 4-Speed Elec Auto W/Overdrive, HD                    $846

Alternative Fuels
◙ KL5  Alternative Fuel (Lpg and Cng Conversion Ready)                    $107

502 ⟶

Axles (Req'd)
☑ GT4  Axle: Rear, 3.73 Ratio                                              N/C
☐ GT5  Axle: Rear, 4.10 Ratio                                              N/C
☑ G80  Axle: Rear Locking Differential                                     $215

Gross Vehicle Weight
ⓑ  ☑ C6P  Gvw: 08600#                                                     N/c

Manufacturer Option Packages (Req'd)
◙ 1SA  Package: Base Decor                                                 N/C
☐ ☑ 1SB  Package: LS Decor                                                 $1944
☐ ☐ 1SC  Package: LS Premium Decor                                         $3248

Wheels
ⓡ  ☑ P06  Wheel Trim: Rally                                               $0

504 ⟶

Option Packages
☐ ◙ V10  Cold-Climate Package                                              $27
☐ ☐ NZZ  Skid Plate Package                                                $81
☐ ◙ VYU  Snow Plow Prep Package                                            $101
ⓡ ☐ ☑ V22  Appearance Package                                              $0     506
☐ ☐ Z82  Trailering Special Equipment: Heavy Duty                          $140
ⓡ  ☑ ZQ3  Convenience Group: Tilt Steering & Speed Control                 $0
☐ ◙ R9B  Marketing Package: Bright Appearance                              $385

FIG. 11

| Country: USA  Fleet: 007777 | GE Capital Fleet Services   *Vehicle Ordering System* |
|---|---|
| Config - Percent Complete: | *Configuration Summary* |
| 100% | 1999 Chevrolet CK20953 C/K 2500 Ext Cab Fleetside 8' Box Pickup |

Help
Main Menu

☐ Remove Prices
☐ Remove Standard Equipment

Save

[ Convert to Order ]   — 602

*Estimated Vehicle Cost*

ABC COMPANY
USA / 007777
Configuration #: —   Rev. —
Last Modified: 01/08/1999
Spec #: —

1999 CHEVROLET C/K 2500 EXT CAB
Manufacturer Model Code: CC20953
4X2 2 Door Pickup
WB: 155.5   C/A: 56.0   GVW: 8600

Previous   Next

Garaging Address:
None specified

Vehicle Price Data - Invoice Pricing
Base Price:           $17924.00
Destination            $640.00
Optional Equipment    $-370.00
Package Discount:       $0.00
Deleted Equipment       $0.00
Incentive            $-300.00

Total Estimated Invoice
Price:                $17894.00
                                    ↘ 600

Optional Equipment – Optional equipment is in addition to or replaces the Standard Equipment

| Code | Description | Invoice Price |
|---|---|---|
| E63 | Body Code: 8' Fleetside | $0.00 |
| L31 | Engine: Vortec 5700 V8 (350 Cu In) SFI | $0.00 |
| MW3 | Transmission: 5-Speed Manual Deep Low W/Overdrive | $0.00 |
| GT4 | Axle: Rear, 3.73 Ratio | $0.00 |
| C6P | Gvw: 08600 # | $0.00 |
| 1SA | Package: Base Decor | $0.00 |
| XHH | Tire: Front, LT245/75R16E All Season SBR B/W | $0.00 |
| YHH | Tire: Rear, LT245/75R16E All Season SBR B/W | $0.00 |
| ZY1 | Paint: Exterior, Solid | $0.00 |
| 41U | Primary - Onyx Black | $0.00 |
|  | Paint: Exterior Solid | $0.00 |
| 79C | Seat/Colors - Red | $0.00 |
|  | Seat: Cloth | $0.00 |
| YG4 | Seat Delete: Rear | $-369.00 |
| VX5 | Fleet Incentive | $-300.00 |
| FE9 | Emission System: Federal Emission Requirements | $0.00 |

604

METHOD AND APPARATUS FOR DEVELOPING AND CHECKING TECHNICAL CONFIGURATIONS OF A PRODUCT

BACKGROUND OF THE INVENTION

1. Field of the Invention

This invention relates to computerized configuration methods and systems. More particularly, this invention relates to computerized methods and systems for developing technical configurations and electronically delivering order reports to a client. The methods and systems are implemented in computer hardware and software.

2. Background Information

Large amounts of data and programs for a great variety of tasks are currently available on the Internet. Some of these applications are useful for performing discrete logical tasks, while others are available to retrieve data. Still other applications are available that may aid in the selection and customization of products, such as vehicles or computers, or services, such as the availability of flights and corresponding fare information. In these selection/customization tools for products or services, the manufacturer of the product or the service provider may offer detailed options for the user's selection, and a large number of interrelationships may exist between the various options. When these options and interrelationships are complex, large and detailed software may be necessary for electronic configuration systems.

The Internet is a collection of computer networks that allows computer users to share files and other computer resources. Each computer connected to the Internet has a unique address whose format is defined by the Internet Protocol ("TCP/IP"). The Internet includes a public network using the TCP/IP and includes two kinds of computers: servers, which provide information and documents; and clients, which retrieve and display documents and information for users. Events that take place on the server machine are referred to as server-side activities, while events that take place on the client machine are known as client-side activities. As will be appreciated by those of ordinary skill in the art, as used throughout this specification the term "client" refers to a client computer (or machine) on a network, or to a process or programs, such as Web browsers, which run on a client computer in order to facilitate network connectivity and communications. Thus, for example, a "client machine" can store one or more "client processes." The term "user" is used to refer broadly to one or more persons who use a particular client machine. Similarly, the term "server" will be used throughout this specification to refer to a server computer or computer system on a network, or to a process or programs which run on a server computer.

The "World Wide Web" ("Web") is that collection of servers on the Internet that utilize the Hypertext Transfer Protocol ("HTTP"). HTTP is a known application protocol that provides users access to resources, which may be information in different formats such as text, graphics, images, sound, video, Hypertext Markup Language ("HTML"), as well as programs. HTML is a standard page description language which provides basic document formatting and allows the developer to specify "links" to other servers and files. Links may be specified via a Uniform Resource Locator ("URL"). Upon specification of a link by the user, the client makes a TCP/IP request to a Web server and receives information, which may be another "Web page" that is formatted according to HTML, from a server that was specified in the requested URL. The information returned to the client may be generated in whole or in part by a program that executes on the server. Such programs are typically Common-Gateway-Interface scripts ("CGI scripts") and can be written using known programming languages or methods that the server supports, such as PERL or C++.

Servers include both Web servers and applications servers. Web servers are the software or computers responsible for accepting requests from clients and retrieving the specified file or specified CGI script, and returning its contents or the CGI script's results to the client. An application server is the actual software or computer which contains programs, CGI scripts, or data for a specific site. Servers run on a variety of platforms, including UNIX machines, although other platforms, such as Windows 95, Windows NT, and Macintosh may also be used.

Computer users can view information available on servers or networks on the Web through the use of browsing software, such as Netscape Navigator, Microsoft Internet Explorer, Mosaic, or Lynx browsers. A typical Web page is an HTML document with text, "links" that a user may activate (e.g. "click on"), as well as embedded URLs pointing to resources, such as images, video or sound, that the client may activate to fully use the Web page in a browser. In some situations, these resources may not be located on the same server that provided the HTML document to the client. Furthermore, HTTP allows for the transmission of certain information from the client to a server. This information can be embedded within the URL, can be contained in HTTP header fields, or can be posted directly to the server using other known HTTP methods.

Web activity begins on the client side, when a user sends a request to a server over the Internet. When a user's browser requests information from a server, the server may send information including graphics, instruction sets, sound and video files in addition to HTML documents (Web pages) to the requesting client. In order to view and use information from the Web using a browser, the entire HTML document must be downloaded from the Internet server to the client's machine and then processed by the browser before the consumer can fully see and access it. A user may become impatient waiting for a graphics-oriented Web page or detailed data to appear on his/her computer screen. Information delivery on the Internet can be frustrating, because it is much slower than delivery of data from the consumer's computer hard drive or main memory.

In a server-side application, the client must repeat the process described above, sending a request to a server over the Internet and receiving information from the server in return, in order for the client to interact with a server over the Internet. For instance, a user may supply information in response to queries in a Web page. When the client clicks on a "submit" button, which initiates interaction over the Internet, the information is passed to the server. As explained above, programs such as CGI scripts may process the information, and the server may then return a Web page containing the information requested by the user.

The Web page received by the client from the server may create or set an ID field, known as a "client ID" or "cookie," located in a file on the client machine to include information about the user's preferences. When the user later returns to a specified URL on the same server, the "client ID" or "cookie" with the previously-set preference information is transmitted in the HTTP request header to the server, which may then return a Web page that is assembled according to the user-specific information. This interactive model for processing information over the Internet is a server-side application, in which most of the logic and data processing is performed on the server side.

A second possible interactive model is to deliver applications directly from the server to the user's browser, where they are executed on the client machine. These applications are typically small tools that perform simple tasks on the client computer, including a variety of HTML page display enhancements. In the typical server-side system described above, servers perform most of the computational work on the Web, and Web browsers may be little more than glorified terminals. With so-called "applets" that run within a Web browser to process information and other client-side programs, Web technology is shifted more toward the client, relieving some of the computational load from the server. Applets may be used for a variety of functions, and an applet may be a full-fledged program that can perform any number of computational and user-interactive tasks on the client computer. For instance, an applet might create a unique set of menus, choices, text fields, and similar user-input tools different from those available through the browser. A number of different languages can be used for client-side programs and applets, such as Java, ActiveX, JavaScript, Helper-Viewer, and other plug-ins. Client-side JavaScript, for instance, is a commonly used programing language that may be embedded into HTML Web pages and allows executable content, as opposed to data, to be distributed over the Internet. JavaScript also has a limited ability to interact with the user.

There are problems associated with both client-side and server-side computational and interactive systems. If a client-side approach is used, a large amount of time and/or bandwidth may be used sending information to the client, a majority of which may not be necessary to the end result desired by the user. When a large amount of time is spent transferring data over the Internet, this may not only be annoying to the user, but it may also clog the network with unnecessary data transfer. Additionally, only a limited amount of space in the memory of the client is available. In view of these constraints, client-side programs are typically only used for simple validations of information entered by the user or to generate graphic effects on the client. Large tasks requiring extensive processing (by reason of large executable files or extensive data files, or both) are usually not performed on the client. One result of this may be that interface and options offered to the client are limited. The client's sense of control over the transaction may therefore be less than desired.

Server-side programs may also have undesirable attributes. Much like client-side systems, a large amount of time may be spent transferring data to and from the server. In a pure server-side system, each time a user performs an operation on the client machine, a request is sent to the server to validate the request and perform an operation for transfer back to the client. A great deal of time may therefore be spent on the network validating information and processing data on the server. Such a system puts a heavy load on the server. In addition to these drawbacks, the user may be annoyed by the large amount of time necessary to interact with the server and update information on the client machine.

It is therefore important to allocate appropriately the processing load and data transfers between the browser and the server. Some tasks, such as forms processing and index searches may be better left to the server side, while others, such as user interface enhancements, real-time data presentation, and input validation may be better suited for local processing on the client. A system and method is needed for interactive network applications to reduce the load on a server, reduce the amount of time required to transfer information over the network, and to save the user time in performing tasks over the network.

Such a system and method may be particularly useful for complex technical configuration tasks in which large amounts of both logic and data may be necessary to successfully configure a product or service. For such technical configuration tasks, a number of constraints or desirable system attributes exist. First, the user's desired configuration must be viable, meaning that the manufacturer or service provider can assemble the various options desired by the user into a product. Second, it is desirable to indicate the price of the fully assembled configuration at the time of the order. Third, it is desirable to present all or most of the available options for a given product to a user on the client machine.

For some technical configuration tasks, such as products where manufacturers offer detailed option choices for configuration, configuring the product may be further complicated by the complex interrelationships and links between different options. Although in some configuration tasks it would be desirable to provide at the client an environment that is as option-rich as possible, technical limitations are encountered that limit the amount of logic and data that may be transferred to the client. For complex configuration tasks, the transmission of all of the logic to the client may be both time consuming and impractical due to memory space; on the other hand, a pure server-side embodiment may require a large amount of interaction between the server and the client as well as a heavy load on the server.

SUMMARY OF THE INVENTION

One embodiment of the invention is a method for developing a technical configuration and electronically delivering to a client from a server an order report for the technical configuration. The method comprises interactively eliciting and electronically receiving from a user on the client a desired technical configuration, wherein the act of interactively eliciting and electronically receiving comprises providing to the client from the server a limited configuration engine and performing a first, limited check on the viability of the desired technical configuration on the client using the limited configuration engine; performing a second, final check on the viability of the desired technical configuration using a full configuration engine on the server; and, in response to the final check, preparing and outputting on the client an electronic order report.

A second embodiment of the invention is a method for creating technical configurations and electronically delivering order reports to at least one client in a computer network having at least one server connectable to at least one client. The method comprises interactively eliciting from a user on the at least one client a desired subset of possible products having technical configurations; in response to the user's desired subset of possible products having technical configurations, downloading from the at least one server to the at least one client limited configuration information and limited configuration programs; interactively eliciting from the user on the at least one client a desired technical configuration and preliminarily checking at the at least one client the viability of the desired technical configuration using the limited configuration information and the limited configuration programs; uploading the desired technical configuration from the at least one client to the at least one server and performing a full check on the viability of the desired technical configuration using full configuration information and full configuration programs on the at least one server; and, responsive to the full check, preparing and outputting on the at least one client an electronic order report.

Another embodiment of the invention is a method for creating vehicle configurations and electronically delivering order reports to at least one client in a computer network having at least one server connectable to at least one client. The method comprises interactively eliciting from a user on the at least one client a desired make, model, and series for a vehicle; in response to the user's desired make, model, and series for a vehicle, downloading from the at least one server to the at least one client limited configuration information and limited configuration programs; interactively eliciting from the user on the at least one client a desired vehicle configuration and preliminarily checking at the at least one client the viability of the desired vehicle configuration using the limited configuration information and the limited configuration programs; uploading the desired vehicle configuration from the at least one client to the at least one server and performing a full check on the viability of the desired vehicle configuration using full configuration information and full configuration programs on the at least one server; and, responsive to the full check, preparing and outputting on the at least one client an electronic order report.

The above methods offer a number of advantages. Because limited configuration information and limited configuration programs are sent to the client, the client is able to do a significant amount of the processing involved in creating a technical configuration. At the same time, interaction with the server may be decreased. In addition, the data downloaded to the client is properly allocated so that not all of the configuration information or configuration programs that exist on the server are sent to the client. The above methods aid in the allocation of information to the client. The client, therefore, is not overloaded with processing, and data transfer time is kept to a minimum.

Another embodiment of the invention is a method for developing a product configuration in a client-server environment, wherein the server has full option attributes and full option rules. The method in this embodiment comprises receiving initial product configuration data from a user on a client; in response to the initial product configuration data, allocating limited option attributes and limited option rules to the client by downloading such limited option attributes and limited option rules to the client; receiving from the client a first proposed product configuration developed from client processing of the limited option attributes and limited option rules; in response to the proposed product configuration and application at the server of the full option attributes and full option rules to the proposed product configuration, allocating and downloading to the client additional option rules; and, receiving from the client a second proposed product configuration developed from client processing of the limited option attributes and additional option rules.

One advantage of the above method is that data is properly allocated between the client and the server. Limited option attributes and limited option rules are sent from the server to the client, so the client is able to do a significant amount of the processing involved in creating a technical configuration. In addition, the data downloaded to the client is properly allocated so that not all of the full option attributes and full option rules that exist on the server are sent to the client. The client, therefore, is not overloaded with processing, and data transfer time is kept to a minimum.

After a full check of the viability of the proposed product configuration is determined on the server, additional option rules may be sent to the client from the server so that the user may properly configure the product.

Another embodiment of the invention comprises an apparatus for creating technical configurations and electronically delivering order reports to at least one client in a computer network having at least one server connectable to at least one client. In this embodiment, the apparatus comprises a limited configuration engine, wherein the limited configuration engine is downloaded from the at least one server to the at least one client in response to data elicited from the at least one client, and wherein the limited configuration engine contains programs to interactively elicit from a user a desired configuration to be uploaded to the at least one server, and a full configuration engine on the at least one server, wherein the full configuration engine contains instructions for performing a full check on the viability of the desired configuration.

Yet another embodiment of the invention comprises a computer-readable medium whose contents cause a computer system to perform a procedure for developing a product configuration in a client-server environment, the computer-readable medium having client programs and server programs with functions for invocation. In this embodiment, the computer-readable medium allows for the interactively eliciting from a user on the client a desired subset of possible products having technical configurations, in response to the user's desired subset of possible products having technical configurations, downloading from the server to the client limited configuration information and limited configuration programs, interactively eliciting from the user on the client a desired technical configuration and preliminarily checking at the client the viability of the desired technical configuration using the limited configuration information and the limited configuration programs, uploading the desired technical configuration from the client to the server and performing a full check on the viability of the desired technical configuration using full configuration information and full configuration programs on the server, and responsive to the full check, preparing and outputting on the client an electronic order report.

Much like the methods of the invention above, the above apparatus and computer-readable medium properly allocate data and information between the server and the client. The limited configuration engine which is sent to the client contains enough data to allow the user to enter a desired configuration, yet a full configuration engine exists on the server to ensure that the desired configuration is viable. The client, therefore, is not overloaded with processing, and data transfer time is kept to a minimum.

DESCRIPTION OF THE DRAWINGS

FIG. 6a is a block diagram detailing transmission of information between the client and the server in one embodiment of the present invention;

FIG. 10 is a diagram of a vehicle options selection page of a vehicle ordering embodiment of the present invention; and FIG. 11 is a diagram of a configuration summary page of a vehicle ordering embodiment of the present invention.

DETAILED DESCRIPTION

The teachings of the present invention are applicable to many different types of computer networks and may also be used, for instance, in conjunction with direct on-line connections to databases. As will be appreciated by those of ordinary skill in the art, while the following discussion sets forth various preferred implementations of the method and system of the present invention, these implementations are not intended to be restrictive of the appended claims, nor are they intended to imply that the claimed invention has limited applicability to one type of computer network. In this regard, the teachings of the present invention are equally applicable for use in Local Area Networks ("LANs") of all types, Wide Area Networks ("WANs"), private networks, and public networks including the Internet and the Web. While the principles underlying the Internet and the Web are described in some detail above and below in connection with various aspects of the present invention, this discussion is provided for descriptive purposes only and is not intended to imply any limiting aspects to the broadly claimed methods and systems of the present invention.

The accompanying Figures depict embodiments of the configuration systems and methods of the present invention, and features and components thereof. With regard to references in this specification to computers, the computers may be any standard computer including standard attachments and components thereof (e.g., a disk drive, hard drive, CD player or network server that communicates with a CPU and main memory, a sound board, a keyboard and mouse, and a monitor). The processor of the CPU in the computer may be any conventional general purpose single- or multi-chip microprocessor such as a Pentium® processor, a Pentium® Pro processor, a 8051 processor, a MIPS® processor, a Power PC® processor, or an ALPHA® processor. In addition, the processor may be any conventional special purpose processor such as a digital signal processor or a graphics processor. The microprocessor has conventional address lines, conventional data lines, and one or more conventional control lines. With regard to references to software, the software may be standard software used by those skilled in the art or may be coded in any standard programming language to accomplish the tasks detailed below.

a. General Overview

Figure 1:
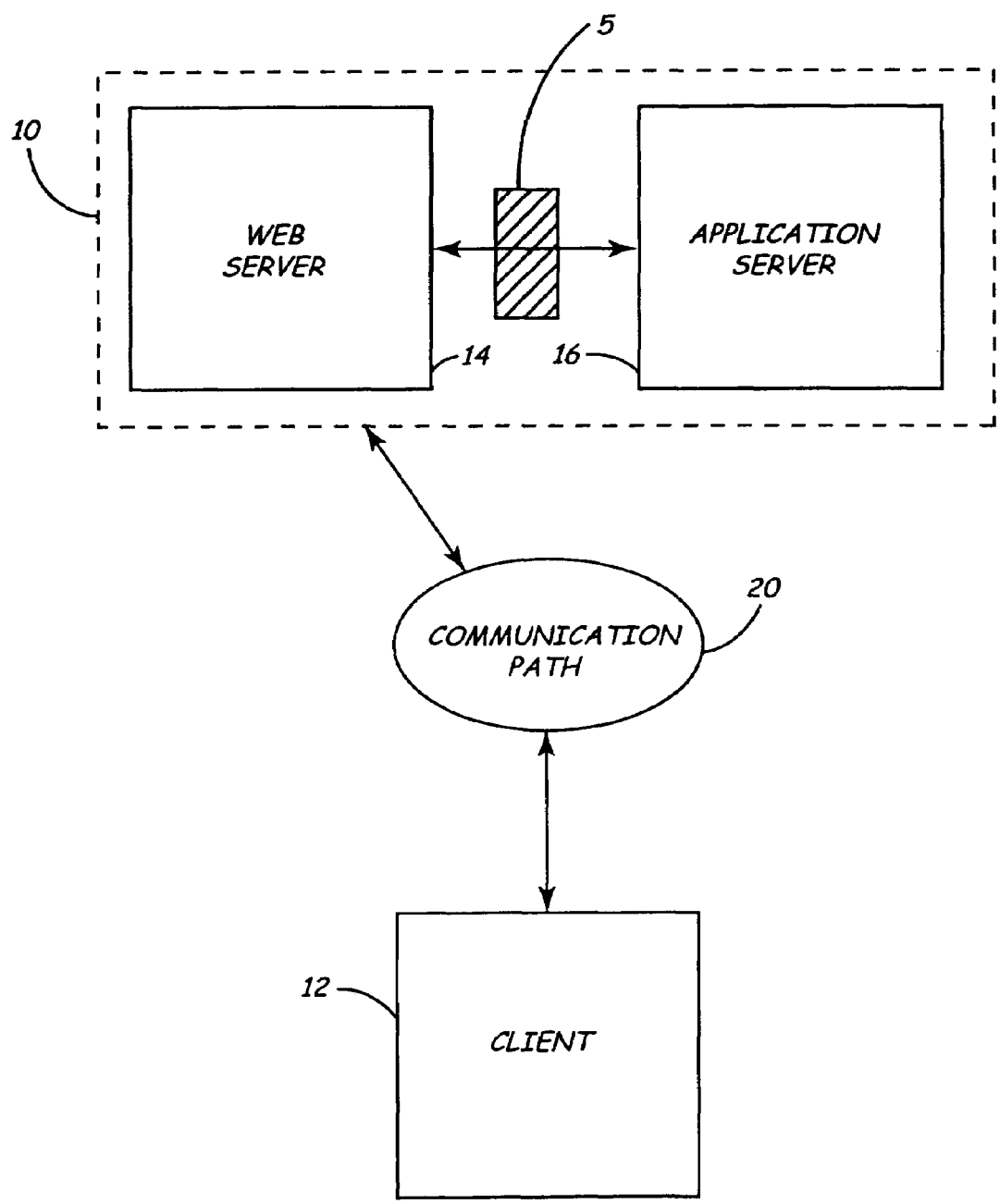
FIG. 1 is a block diagram overview a client-server system in which the present invention functions.

FIG. 1 is a block diagram illustration of the environment of the present invention, which is a computer network based on a client-server model. The network comprises one or more servers 10 which are accessible by one or more clients 12, such as personal computers. (For simplicity, FIG. 1 shows only one server 10 and one client 12.) The servers 10 communicate with the clients 12 over a communication path 20, which may be a Local Area Network (LAN), Wide Area Network (WAN), direct dial connection, the Internet, or other suitable telecommunications path. A suitable network protocol, such as the TCP/IP protocol, may be used for the communications. As described above, the servers 10 may comprise Web servers 14 and application servers 16, and may be any computer known to those skilled in the art. Although FIG. 1 depicts a Web server 14 and an application server 16 as separate entities, these two servers 14, 16 may exist within a single computer or computer system, which, throughout this specification, will be referred to as server 10. The server 10 allows access by the clients 12 to various network resources. As shown in FIG. 1, a firewall 5 may exist between the Web server 14 and application server 16 of the server 10. Such firewalls 5 are known to those skilled in the art and may be used to prevent unwanted access to the application server 16.

1. The Client-Side

Figure 2:
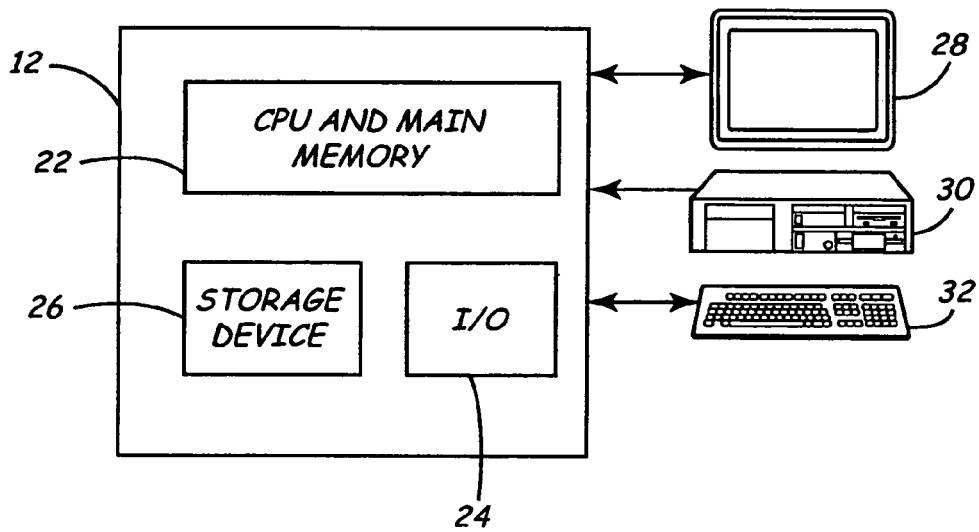
FIG. 2 is a block diagram of the hardware of the client machine of FIG. 1.

FIG. 2 is a block diagram of a representative client computer 12. As described above, the client 12 may be any conventional computer known to those skilled in the art. The client 12 comprises a processor or CPU and main memory 22, an input/output interface 24 for communicating with various databases, files, programs, and networks, and one or more storage devices 26. The storage devices 26 may be disk drive devices or CD ROM devices. The client 12 may also have a monitor 28 or other screen device, a printer or other output device 30, and in input device 32 such as a keyboard. As is well known in the art, the computer 12 executes programs stored on a data storage medium, which may be either a memory system of the client 12 or a persistent storage device 26, such as a disk or CD ROM system, so as to carry out the functions of the present invention.

Figure 3:
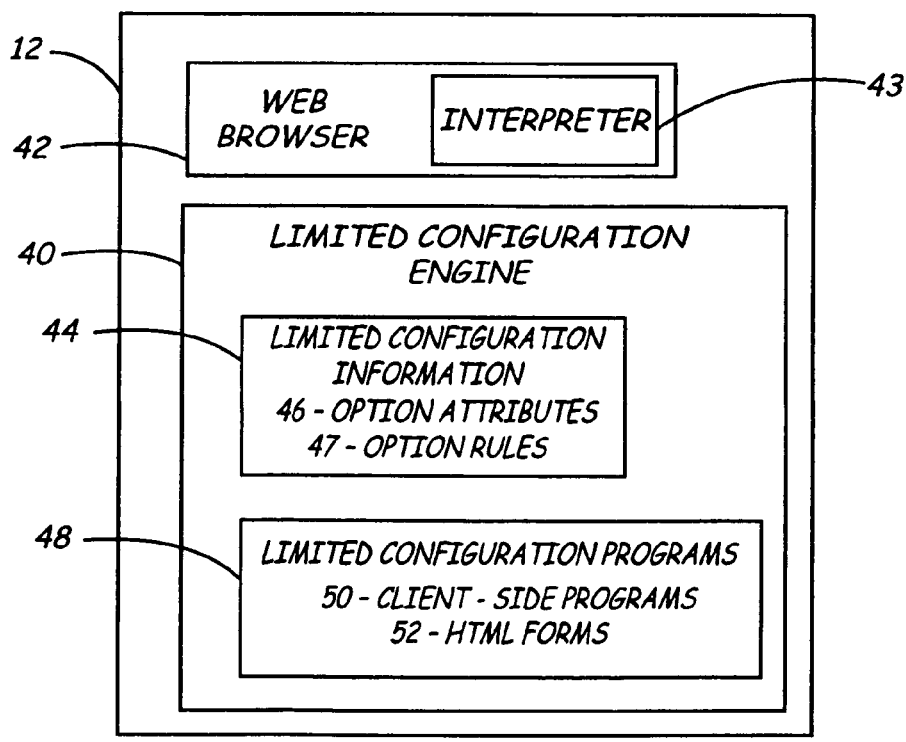
FIG. 3 is a block diagram of the software of the client machine of FIG. 1.

FIG. 3 is a block diagram illustrating various programs or software which may run on the client 12 when it will be used for configuration tasks. Although these programs are listed as separate entities in FIG. 3, these programs may be included within one software module which may collectively be referred to as software or a software program. In one embodiment, these programs as well as the programs on the server, the functions of which will be described in more detail below, may be contained on a computer-readable medium, such as a standard floppy disk. In an embodiment where the communication path 20 is the Internet or an Intranet, each of the clients 12 may run a Web browser 42, which is a known software tool used to access the Web via a connection obtained through an Internet access provider. A variety of browsers 42 known to those skilled in the art may be used within the scope of the present invention, including Netscape Navigator, Microsoft Internet Explorer, or Mosaic browsers. In one embodiment, a browser 42 that is capable of running client-side programs, such as JavaScript, may be used. An interpreter 43 may exist either within the browser 42 or outside the browser 42 on the client 12. This interpreter 43 may be capable of interpreting or processing client-side programs within the browser 42 so that the client-side programs may function within the browser 42. As explained above, a Web server 14 may allow access to so-called "Web sites" and applications available on application servers 16, as shown in FIG. 1. As is also described above, the location of a resource on a server 10 may be identified by a URL. The client 12 may also retain a small "cookie," as defined in the background section, to retain state information regarding the server 10 to which the client 12 exchanges requests.

Referring again to FIG. 3, the client 12 may also contain other software or programs which may reside in the main memory 22 of the client 12 or which may be persistently stored in the storage device 26 of the client 12. A limited configuration engine 40 may reside on the client 12. This limited configuration engine 40 may contain limited configuration information 44 and limited configuration programs 48. As will become clear in the following description, the limited configuration engine 40 is a portion of a full configuration engine which resides on the server 10. The role of the client 12 in the configuration systems and methods is to display screens, allow the user to fill in information on the screens, perform limited, discrete logic tasks on the information on the screens at the client 12 level, and to exchange data with the server 10.

The limited configuration information 44 is essentially a set of data for specifying a particular product or service (throughout the remainder of this specification, the term product will be used to refer to a product or service). For instance, the data may consist of a set of limited option attributes 46 and limited option rules 47 for a given product. An option attribute 46 may be a feature or option of a product, such as a type of engine or transmission in a vehicle along with the corresponding price, from which a user chooses in configuring a product. The data may also consist of a set of limited option rules 47 for a product. The option rules 47 consist of a set of logic rules that links or defines relationships between certain of the option attributes 46. For instance, if the configuration system and method is for a vehicle, a certain type of emissions system or transmission may only be available for certain engine types, or certain interior color schemes may only be available for certain exterior color packages. If A, B, and C are three different option attributes 46 for a product or service, various option rules 47 may include, but are not limited to, the following:

- if A, then B (meaning that if option attribute A is selected, then option attribute B is automatically selected as well);
- if A, then B optional (meaning that if option attribute A is selected, then option attribute B is automatically selected as well, but it may be deselected);
- if A, not B (meaning that if option attribute A is selected, then option attribute B may not be selected);
- if A and B, then C (meaning that if option attributes A and B are selected, then option attribute C is automatically selected);
- if A, then B or C (meaning that if option attribute A is selected, then option attribute B or C must be selected).

Numerous other possible option rules 47 may also be used. Some of these additional option rules 47 may be related to the price of the configuration as a whole. For instance, if option attribute A is selected, then the user may get a discount on option attribute B or may get option attribute B for no additional cost.

The limited configuration programs 48 of the limited configuration engine 40 may comprise programs that perform such functions as processing the option attributes 46 and option rules 47, performing the logic in the option rules 47, and formatting the layout of a Web page on the client's monitor 28. If the Internet will be used with the configuration methods and systems, the limited configuration programs 48 may comprise client-side programs 50, such as Java, ActiveX, JavaScript, Helper-Viewer, and other plug-ins or other client-side programs, and HTML forms 52. The client-side programs 50, which may be programs capable of running within the browser 42 used with the invention, may process the option attributes 46 and option rules 47 and run the logic for the processing on the client-side. The HTML forms 52 provide basic Web page formatting that aids in the presentation of the Web page and allow the developer to specify "links" to other servers 10 and files. Although the HTML forms 52 are represented in FIG. 3 as a part of the limited configuration programs 48, the HTML forms 52 may also reside within the limited configuration information 44. The distinction between that data or those programs that reside within the limited configuration information 44 or the limited configuration programs 48 is not important. This distinction is instead made merely by way of example, and therefore does not limit the invention.

The limited configuration engine 40 may be downloaded from the server 10 to the client 12 in response to requests from the user or based on server 10 logic, both of which will be explained in more detail below. Once resident on the client machine 12, the limited configuration engine 40 may reside in memory 22 or within a storage device 26. In some cases, the client 12 may "cache" a limited configuration engine 40 or other resource obtained over the network so that it is temporarily stored on the client machine 12 in either the main memory 22 or on disk or on another storage device 26. The cached copy of the resource may then remain resident on the client 12 for a defined period and may be easily accessed instead of obtaining it over the Internet or network when the resource is needed at a later time. In such cases where cached programs are used, neither the basic operations nor functions of the configuration systems and methods nor the transmission of information to a server 10, differ from the cases where cached copies are not used.

2. The Server-Side

Figure 4:
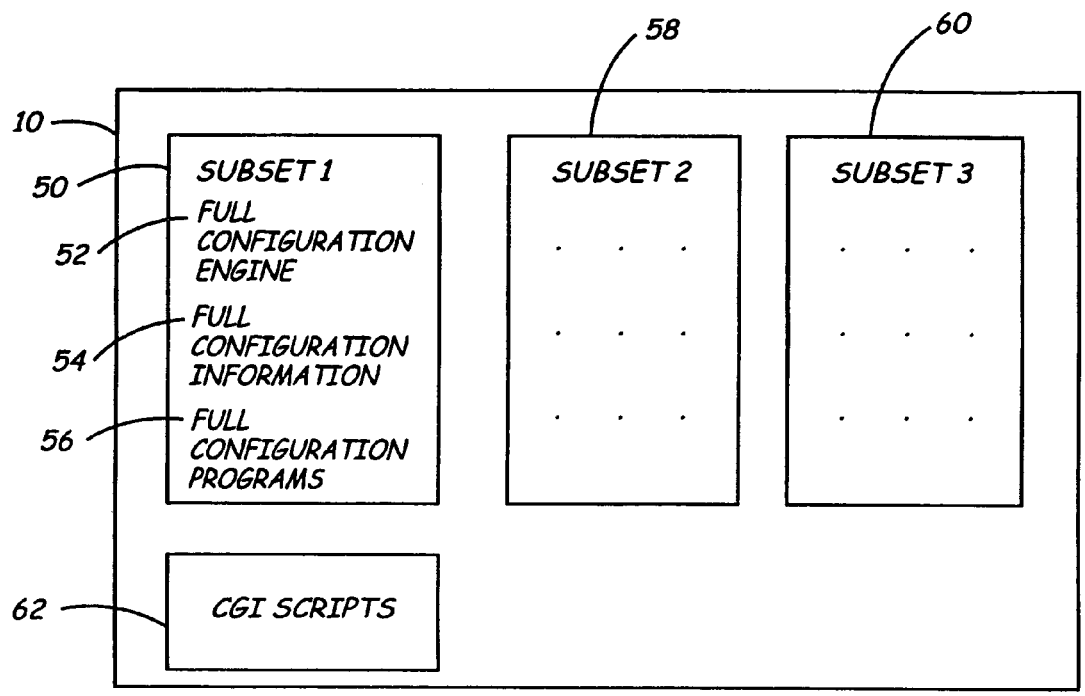
FIG. 4 is a block diagram of the software and programs on the server of FIG. 1.

FIG. 4 illustrates in block form one embodiment of a portion of the contents of the server 10 or, more particularly, the application server 16. The server 10 contains programs that run on the server-side to process requests and responses from the client-side, send the proper information to the client 12, and perform processes on the server-side. If the Internet is used within an embodiment of the invention, these programs may be CGI scripts 62, as depicted in FIG. 4. Within the server 10, the full configuration engine 52 resides for each possible subset of the full universe of possible products. Each subset may represent a different type of configuration, and any number of subsets may be present on the server 10. For simplicity, FIG. 4 shows three subsets 50, 58, 60. For instance, if the configuration systems and methods will be used for vehicle configurations, each subset may represent a different make, series, and model of a vehicle. A different subset 50, 58, 60 would therefore exist for each different vehicle model. If the configuration systems and methods will be used for computer configurations, each subset may represent different manufacturers and type of computer, such as a laptop or desktop. Although FIG. 4 represents one possible embodiment of the organization of information within the server 10, a variety of other organizational schemes known to those skilled in the art may also be used. As shown in FIG. 4, each subset 50, 58, 60 may contain the full configuration engine 52 for one particular subset of the configuration system.

Figure 5:
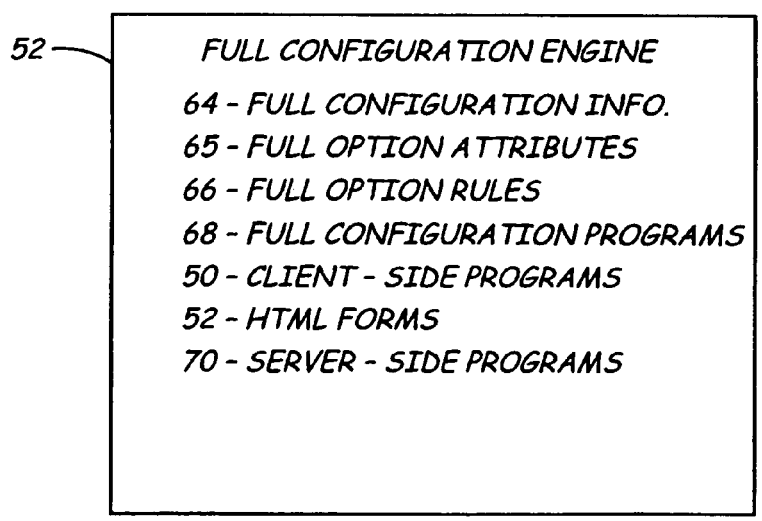
FIG. 5 is a more detailed block diagram overview of the full configuration engine on the server.

Referring now to FIG. 5, the full configuration engine 52 for each subset 50, 58, 60 consists of the full configuration information 54 and full configuration programs 56 for that particular subset. Within the full configuration information 64 are the full option attributes 65 and the full option rules 66, which are similar in nature to the option attributes 46 and option rules 47 within the limited configuration information 44 on the client-side. The full option attributes 65 and full option rules 66 on the server-side, however, may contain more detailed rules that define relationships among the option attributes 65 than those option rules 47 that reside on the client 12. Because the server 10 will likely not have the constraints on storage and processing of detailed option rules as may the client 12, a full set of option rules 66 with corresponding interrelationships between option attributes 65 may reside on the server 10. Within the full option attributes 65 and full option rules 66 reside the limited option attributes 46 and option rules 47 which may be downloaded to the client 12 during a configuration session.

The server 10 may receive the full option attributes 65 and full option rules 66 in a variety of ways. In one embodiment, the technical information for the product or service may be received in paper form from the manufacturer or dealer of the product or service, or from an information provider that may receive and compile information for different technical products and services. The full option attributes 65 and full option rules 66 may then be entered into the system by human beings. In another embodiment, a manufacturer, dealer, or information provider may transmit an electronic file which includes technical configuration information for a product or service. This technical configuration information may then be electronically processed and entered into the system as full option attributes 65 and full options rules 66.

The full configuration engine 52 on the server 10 also contains the full configuration programs 68, which may include of the client-side programs 50 and HTML forms 52 which may be sent to the client 12 as limited configuration programs 48 during a configuration session, as well as server-side programs 70 which process the information and rules in the full configuration engine 52 on the server 10. Although the client-side programs 50 and HTML forms 52 on the server 10 may be the same versions as those downloaded to the client 12 during a configuration session, the server-side programs 70, which may be CGI scripts as depicted as numeral 62 on FIG. 4, are not downloaded to the client 12, but instead reside and process logic and information on the server 10.

As explained in the background section of this specification, it is generally desirable to send only a limited amount of information to the client 12 due to data transfer time and client 12 response limitations. For this reason, only limited option rules 47 are sent to the client 12 in the limited configuration information 44, while a full set of option rules 66 exist on the server 10. In one embodiment, all of the option attributes 65 on the server 10 are transferred within the limited configuration information 44 to the client 12, but less than all of the option rules 66 on the server 10 are sent to the client 12. In this embodiment, a set of the full option rules 66, which may be much more complex than the option rules 47 sent to the client 12, resides only on the server 10. The user on the client 12 in this embodiment, therefore, may be able to see each potential option attribute 65 for a product, but not all of the links between each option attribute 65 and other option attributes 65 will be present on the client 12. The user on the client 12, therefore, may be able to select different option attributes 46 through an HTML Web page and certain of the option rules 47 on the client 12 and client-side programs 50 may specify interrelationships among the option attributes 46, yet a full application of the option rules 66 may be reserved for the server-side.

b. Operation of the Invention

Figure 6B:
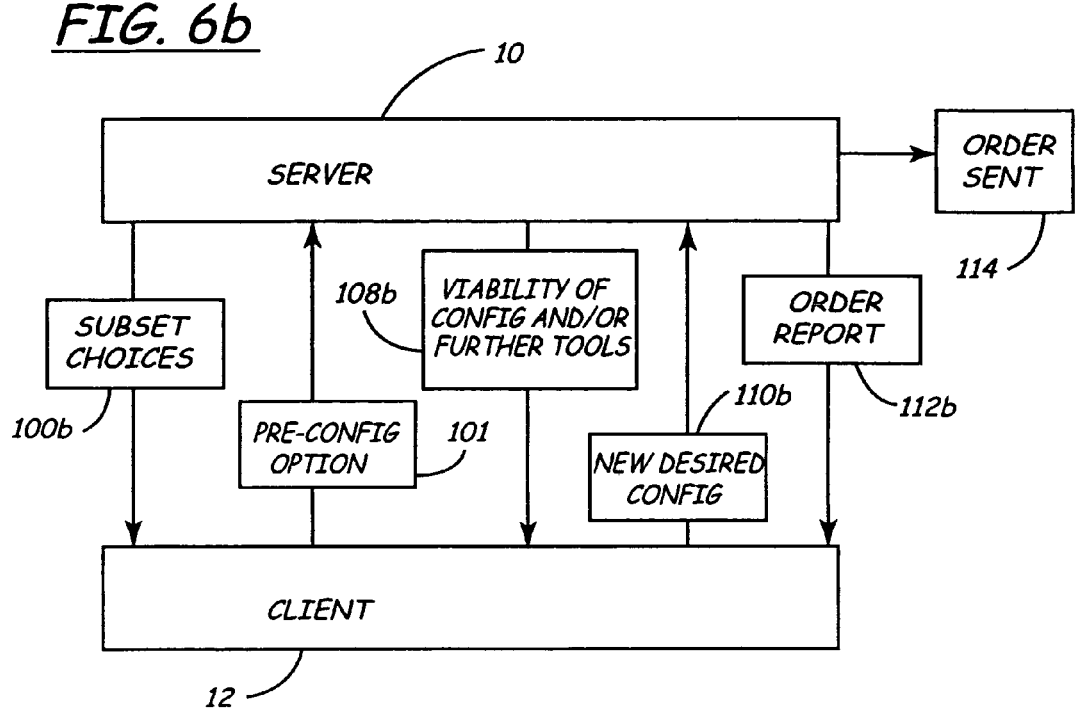
FIG. 6b is a block diagram detailing transmission of information between the client and the server in a second embodiment of the present invention.
Figure 6C:
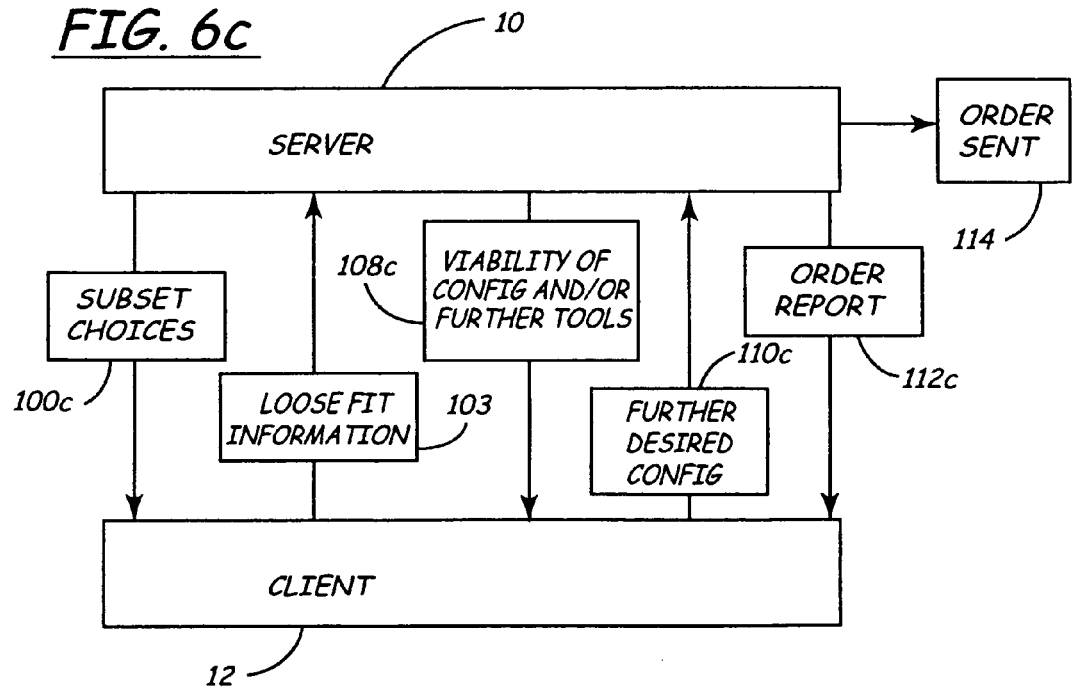
FIG. 6c is a block diagram detailing transmission of information between the client and the server in a third embodiment of the present invention.

The operation of the configuration systems and methods will first be illustrated as a broad application for any variety of product configurations in reference to FIGS. 6a–6c, and then for a specific application to vehicle ordering methods and systems with reference to FIG. 6a and FIGS. 7–10. FIGS. 6a–6c are block diagram overviews of three embodiments of the methods and systems of the present invention which contains sections detailing the exchange of information between the server 10 and the client 12. The server 10, which in one embodiment may be an application server 16 as shown in FIG. 1, contains the subsets 50, 58, 60 of full configuration engines 52 as shown in FIGS. 4 and 5.

1. Tight Configuration Embodiment

FIG. 6a shows a block diagram overview of information exchange in a tight configuration embodiment of the present invention. This embodiment may be referred to as a "tight" configuration embodiment because the user selects each selectable option until a viable configuration is assembled.

a. Subset Selection

To begin a configuration session, the user may access the page on the server 10 associated with the configuration system to initiate a session. In an embodiment of the invention using the Web, such a page may be an HTML Web page. A registration or enrollment session may require the user to submit certain information about himself or herself in order to use the configuration system. The server 10 may then send to the client 10 a variety of subset choices 100 of products from which to assemble a configuration. The subset choices 100 may be presented to the user on the client 10 through an HTML Web page on the client's monitor 28. Because a limited amount of space may be available in the main memory 22 of the client 12, the amount of information presented for each subset choice 100 may be limited to a discrete amount. As previously noted, each subset may represent a different make, model, or series of a product. After the user selects a desired subset 102, which may then be uploaded to the server 10 as shown in FIG. 6a, a second set of subset choices 100 may be presented to the user to further refine the subset choice 100 for a configuration session. In this manner, the exchange of subset choices 100 and desired subsets 102 between the client 12 and the server 10 may be repeated a number of times until a discrete amount of data for which the client 12 has space may be downloaded from the server 10 to the client 12. In a configuration system with only one or a few subset choices 100, these subset choices 100 may be presented to the user on the client 12 in one page, or may be intertwined with later pages described below which may be used to select option attributes 46 during a configuration session.

The user's desired subset 102 represents initial product configuration data, which the server 10 uses to allocate a limited configuration engine 40 to the client 12. Different limited configuration engines 40 will be downloaded to the client 12 from the server 10 for each different desired subset 102.

b. Preliminary Viability Check

After a small enough segment of data to operate a configuration session on the client 12 may be downloaded to the client 12, a limited configuration engine 40 (shown as numeral 104 in FIG. 6a during transfer to the client 12 from the server 10) is downloaded to the client 12. As explained in connection with FIG. 3, the limited configuration engine 40 may contain limited configuration information 44 and limited configuration programs 48. In one embodiment, the limited configuration engine 40 contains HTML forms 52 for presentation of information on the client 12. The option attributes 46 of the limited configuration information 44 may therefore be presented to the user through a Web page, and the limited option rules 47 may perform some limited operations on the client 12. In one embodiment, one set of limited configuration programs 48 may be downloaded to the client and used with any given subset which the user selects. In this embodiment, only the limited configuration information 44 would differ from one subset to another.

The Web page presented to the user on the client 12 may interactively elicit information from the user through various interfaces known to those skilled in the art, such as drop-down boxes, scroll bars, or check boxes. As the user selects various option attributes 46 in the Web page, the option rules 47 and the client-side programs 50 on the client 12 may update the screen to reflect the interrelationships of the various option attributes 46 selected. Thus, through the use of Java, ActiveX, JavaScript, Helper-Viewer, or other plug-ins or client-side programs 50 known to those skilled in the art, in conjunction with the limited configuration information 44 and limited configuration programs 48 available on the client 12, the user's choices may be preliminarily checked for viability on the client machine 12. Because the information on the client 12 in the limited configuration engine 40 will be a truncated version of the full configuration engine 52 on the server 10, the validity of the user's desired configuration may only be preliminarily checked. In one embodiment, if a user's selection is not viable, the Web page will not allow the user to select a certain option attribute 46. In addition, the Web page may update the user after various choices on the client's monitor 28, so that information, such as an approximate price of the product, may be updated dynamically on the client 12 as the user configures a product by selecting option attributes 46.

In one embodiment, it is important to note that the limited configuration engine 40 downloaded to the client 12 (as shown as numeral 104 in FIG. 6a) may contain a discrete segment of information so that the user may make a variety of choices on a Web page, yet do so without active interaction with the server 10. This offers the advantage of a limited amount of time spent downloading information to and uploading information from the client 12. As the user interacts with the Web page to select choices for a configuration, this limited processing and checking may be done on the client 12 instead of on the server 10.

c. Full Viability Check

When the user has completed entering his or her desired configuration, the user can click on the "submit" button to upload the desired configuration 106 to the server 10, as shown in FIG. 6a. This desired configuration 106 is the user's proposed product configuration, which, though it has been preliminarily checked for viability using the limited option attributes 46 and limited option rules 47 on the client 12, may not be viable when checked against the full option rules 66 on the server 10. Because only a preliminary check of the user's desired configuration 106 was performed on the client 12 using the limited configuration engine 40, the complete validity of the configuration may be determined on the server 10, which contains a full set of the option rules 66 as well as server-side programs 70. The server 10 therefore determines the viability of the desired configuration using the full configuration engine 52. As explained above, this full configuration engine 52 may be a more complete and detailed version of the limited configuration engine 40 on the client 12. For example, many of the interrelationships between different option attributes may exist only on the server 10 due to limited space in the main memory 22 of the client 12. In particular, full pricing information, which may be complex due to package deals, discounts, and upgrade pricing deals, may reside only on the server 10.

In one embodiment, all option attributes for a given subset may be presented to the user on the client 12, and it may be only a detailed processing of the user's desired configuration that is uniquely carried out on the server 10, in part because the client-side programs 50 and option rules 47 provided to the client 12 may not be sophisticated enough to carry out this processing on the client 12 due to limited space. After the viability status of the desired configuration 106 is determined at the server 10, the viability status of the configuration 108 may be downloaded to the client 12 as shown in FIG. 6a during transfer from the server 10 to the client 12.

If the desired configuration 106 is viable, an order report 112 may also be downloaded to the client 12. This order report 112, which may be downloaded to the client 12 in place of or in addition to the downloading of the viability of the configuration 108, may report the final price of the configuration as well as a summary of each of the options selected by the user.

If the desired configuration 106 is not viable, the viability status of the configuration 108 sent from the server 10 to the client 12 may report the unresolved viability issues to the user on the client 12. For instance, the Web page used for presenting the options to the user on the client 12 may again be presented to the user on the client 12 with certain option attributes 46 highlighted with a note describing a problem with the desired configuration. Similarly, if the user does not select a choice from certain option attributes 46 for which a selection is mandatory, the user may be presented with a reminder to select one or more of those option attributes 46. In one embodiment, if the desired configuration is not viable, the server 10 may download updated limited configuration information 44 and updated limited configuration programs 48 to the client 12. The server 10, therefore, may allocate and download additional information to the client 12, which may include additional limited option attributes 46 and limited option rules 47, so that the user may assemble a viable configuration. In another embodiment, only additional option rules 47 may be allocated to the client 12 at this time. The updated limited configuration engine 40 may then be used on the client 12 by the user for entering a desired configuration.

In this manner, the user will be prompted to assemble a viable configuration on the client 12 through any number of communications with the server 10. This new desired configuration 110 may then be uploaded to the server 10. When such a viable configuration has been entered by the user, submitted to the server 10, and approved as being viable by the server 10, an order report 112 may be sent to the client 12.

The configuration methods and systems of the present invention may present any number of Web pages with various option attributes 46 to the client 12 in the manner described above, such that the acts described above may be repeated any number of times with different option attribute choices until a full and viable configuration has been assembled. When such a full and viable configuration has been assembled, an order 114 may be electronically sent from the server 10 to the manufacturer or service provider so that the configuration may be assembled or ordered.

2. Pre-Configuration Embodiment

FIG. 6b shows a block diagram overview of information exchange in a pre-configuration embodiment of the present invention. Much like the tight configuration embodiment described above, in this embodiment the server 10 may send to the client 12 a variety of subset choices 100*b* of product embodiments from which to assemble a configuration. The user then selects a pre-configuration option, as denoted by numeral 101 in FIG. 6*b*. The subset choices 100*b* presented to the client 12, therefore, may allow the user to select the pre-configuration embodiment in this embodiment. The pre-configuration option allows the user to select product configurations which have already been configured, either in prior configuration sessions with the user or by the server 10. For example, popular product configurations could be presented as options to save the user time in configuring a product. In one embodiment, each new configuration the user develops could be saved so that the user may later select it as a pre-configured product.

After the pre-configuration data is uploaded to the server 10, the server 10 performs a viability check on that data, much like described above for the tight configuration embodiment. This information sent from the client 12 to the server 10, which may also be called initial product configuration data, should typically result in a viable configuration in this embodiment, because a pre-configured product has been chosen by the user. The pre-configuration option may, however, only select some of the options of the product in one embodiment, such that the user may still need to complete the configuration by selecting the rest of the options. Numeral 108*b* in FIG. 6*b* shows the server 10 downloading to the client 12 the viability of the pre-configured product or further tools for configuration. For example, limited configuration information 44 and limited configuration programs 48 may be downloaded to the client 12 so that the user can complete the configuration or, if the configuration is not viable, select different options to assemble a viable configuration. After the user has completed assembling a further desired configuration (if needed because the pre-configured product is either not viable or is not complete), this further desired configuration 110*b* is uploaded to the server 10. After any number of iterations of the above described acts and after the server 10 finds a desired configuration viable, an order report 112*b* may be sent to the client 12.

3. Loose Configuration Embodiment

FIG. 6*c* shows a block diagram overview of information exchange in a loose configuration embodiment of the present invention. This embodiment may be referred to as a "loose" configuration embodiment because the user generally enters desired options in free text form and the server 10 finds the closest viable configuration matching to those desired options.

Much like the embodiments described above, in this embodiment the server 10 may send to the client 12 a variety of subset choices 100*c* of product embodiments from which to assemble a configuration. The user then selects a loose fit option, as denoted by numeral 103 in FIG. 6*c*. The subset choices 100*c* presented to the client 12, therefore, may allow the user to select the loose fit embodiment in this embodiment. When the user selects the loose fit embodiment, the user may then enter in a dialog box presented to the user on the client 12 desired options in free text or other similar form. This loose fit information 103 is then uploaded to the server 10. In one embodiment, a human being processes the desired options to find the closest viable configuration. In another embodiment, the server 10 processes the desired options and finds the closest viable configuration. In this embodiment, the server 10, therefore, may run a CGI script 62 using the full option attributes 65 and full options rules 66 to find the closest viable configuration.

Numeral 108*c* in FIG. 6*c* shows the server 10 downloading to the client 12 the viability of the desired configuration and, if needed, further configuration tools. In one embodiment, if a viable configuration may not be developed which is similar to the user's loose fit information, therefore, further configuration tools (in the form of a limited configuration engine 40) may be sent to the client 12 from the server 10. The user may then further develop the product configuration and a further desired configuration 110*c* may be uploaded from the client 12 to the server 10. Eventually, after a viable configuration has been assembled through any number of iterations of the above acts, an order report 112*c* may be sent from the server 10 to the client 12.

c. Vehicle Ordering Embodiment

FIGS. 7–11 detail one embodiment of the configuration methods and systems described above for vehicle configuration and ordering.

1. Business Context

Figure 7:
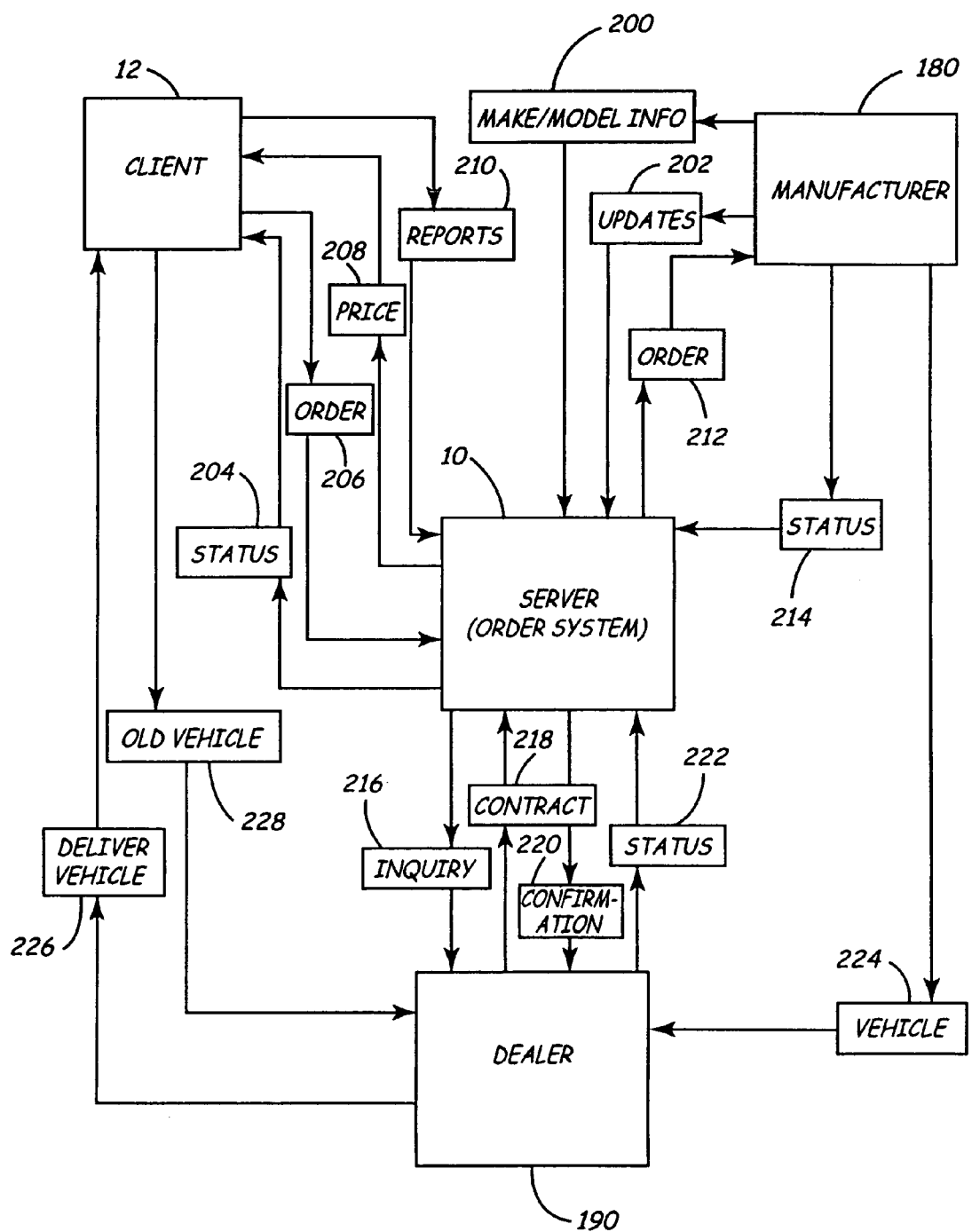
FIG. 7 is a block diagram overview of the business context of a vehicle ordering embodiment of the present invention.

As an introduction to a vehicle ordering system, FIG. 7 illustrates the general business process of a vehicle ordering system showing the flow of information between four different entities: the user or client 12, the configuring party represented by the server 10, the manufacturer 180 of the vehicle, and the vehicle dealer 190. A configuration system operated by a configuring party may be important and useful for a number or reasons. First, a configuring party may assist companies in developing and maintaining large or small fleets of vehicles through such systems. If a company has a large fleet of vehicles to maintain, a configuring party may be able to assist in record-keeping for the vehicles (such as for maintenance or license tab renewal), and may provide an interface between the company and vehicle dealers to simplify vehicle configuration and ordering. Second, because a configuring party may be ordering large numbers of vehicles, the configuring party may get a discount on vehicle prices from the dealers. Finally, the configuring party may aid in the financing process for a company's fleet of vehicles, such that the fleet of vehicles may be financed or leased in the aggregate through the configuring party.

At step 200, the server 10 receives make and model information including details on options for makes, models, and series, from the vehicle manufacturers 180. It is important to note that the manufacturer sets the options and interrelationships between options, including pricing, for various makes and models. The complexity of these options and interrelationships may make it impractical to perform all of the logic associated with a vehicle configuration on the client 12. This information may be updated periodically, as depicted in step 202, so that all of the latest options may be available on the server 10. At step 204, the server 10 may send information to the client 12 regarding vehicle ordering. At block 206, the client 12 orders a vehicle using a vehicle ordering system, which will be explained in greater detail below. At block 208, a vehicle price is delivered to the client 12 for such a vehicle, and the client 12 then reports the decision back to the server 10 to order the vehicle at step 210. After the vehicle configuration is delivered to the manufacturer at step 212, the status of the vehicle construction and/or delivery is delivered to the server 10.

At step 216, the server 10 inquires with the dealer as to the delivery of the vehicle. A contract may be delivered to the server 10 at step 218 and confirmation of the vehicle order may be delivered to the dealer at step 220. At step 222, the status of the vehicle configuration may be delivered to the server 10. At step 224, the vehicle is delivered to the dealer for delivery to the client 12 at step 226. Finally, the client 12 may deliver an old vehicle to the dealer at step 228.

2. Vehicle Ordering System and Methods

Figure 8:
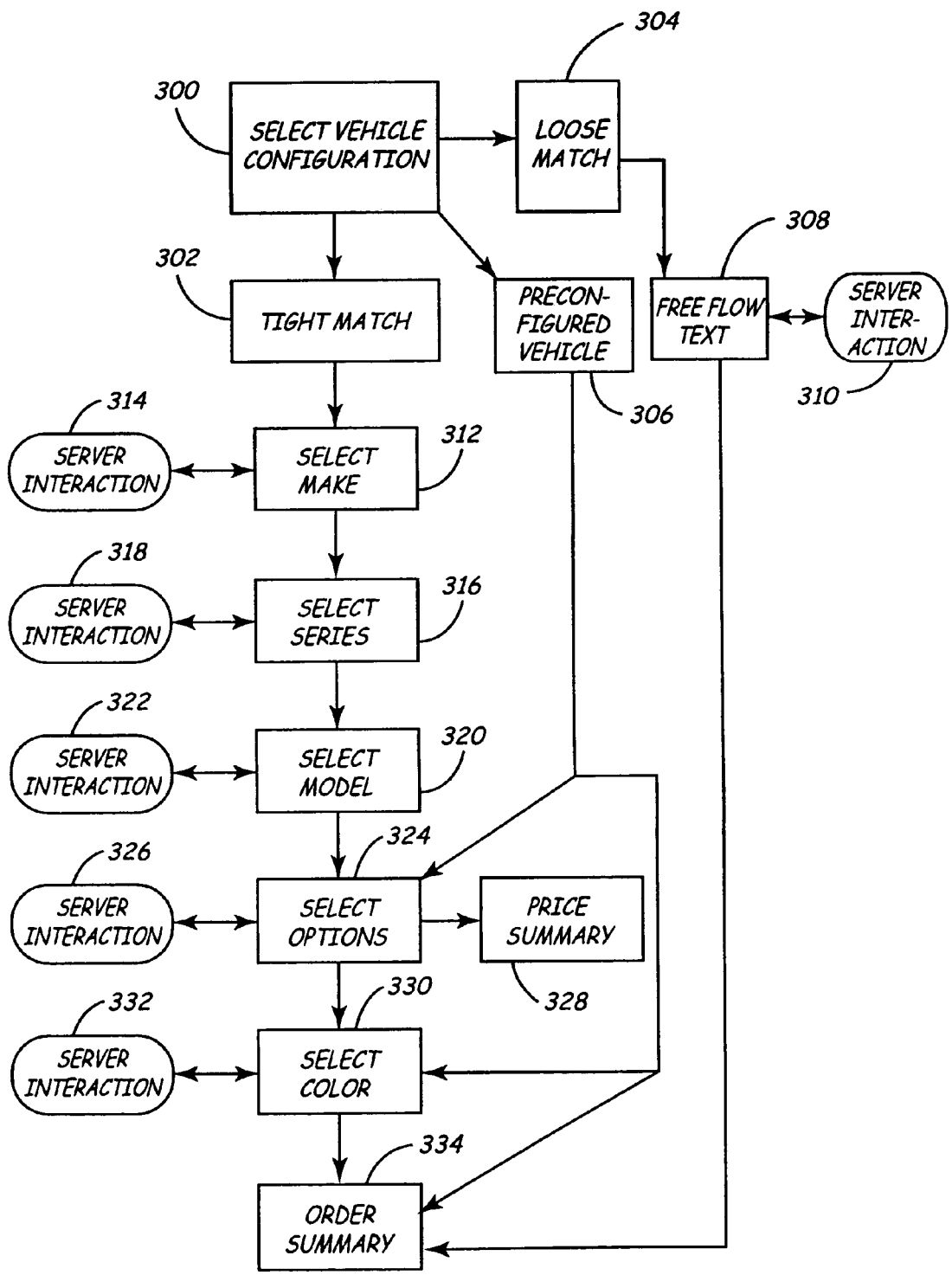
FIG. 8 is a flow chart showing the operation of the vehicle ordering embodiment of the present invention.

FIG. 8 details in block diagram form the flow of the vehicle configuration methods and systems which may be used for developing a valid vehicle configuration and for ordering a vehicle. At block 300, the user enters the vehicle configuration system to begin the configuration process. Initially, the server 10 may download a variety of options to the client 12, including, as depicted in FIG. 8, a pre-configuration option 306 and the option for the user to select either a loose match 304 or a tight match 302 of option attributes with viable vehicle configurations. These three embodiments, which were described above in a general product configuration embodiment, aid the server 10 in determining how much and which limited configuration engines 40 to download to the client 12 from the server 10.

If the user chooses a loose match 304 between the desired options and viable configurations, a freeflow text screen may be presented to the user at block 308 on the client 12 to enter desired vehicle option attributes in free text form. When the user clicks the submit button the desired configuration is uploaded to the server 10 (denoted by block 310 in FIG. 8 and as the loose fit information 103 in FIG. 6c). In one embodiment, the server 10 may determine the closest match to the loose fit information 103 by performing a word matching analysis to find a close match. Further configuration tools may need to be presented to the user on the client 12 to further develop a configuration, as described above, such that any number of interactions with the server 10 may be necessary to develop a viable configuration. In another embodiment, a human being may process the desired option attributes to find the closest possible match. As depicted at block 334 in FIG. 8 and as the order report 112c in FIG. 6c, an order report 112c may then be delivered from the server 10 to the client 12.

Figure 9:
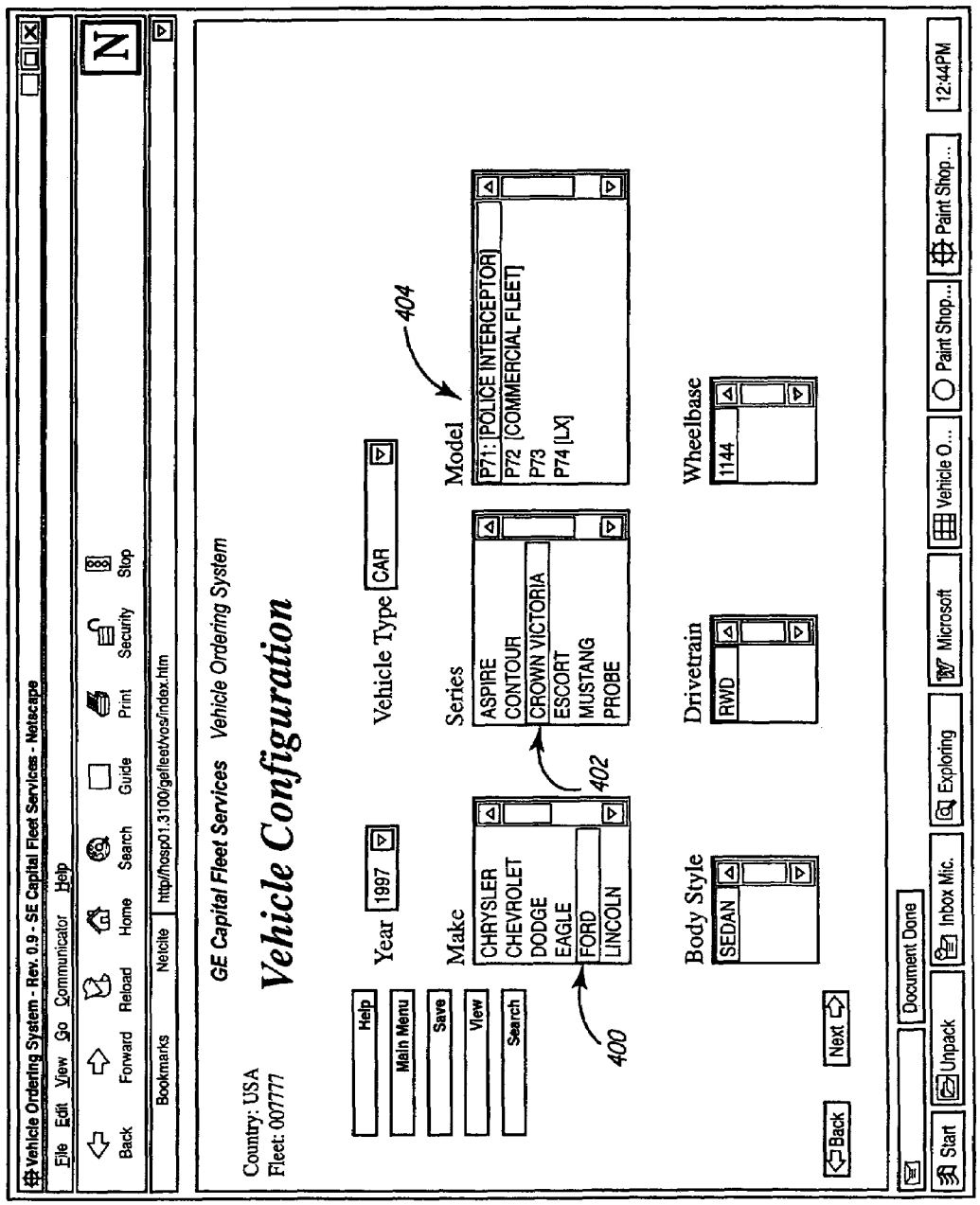
FIG. 9 is a diagram of a make/series/model selection page of a vehicle ordering embodiment of the present invention.

In the typical scenario where a user desires to select all of the desired option attributes of a vehicle in the tight configuration embodiment (as in FIG. 6a), the user may be prompted to select certain choices through HTML Web pages on the client 12. In this embodiment, the user may first be prompted to select a make of a vehicle, as depicted in block 312 of FIG. 8. FIG. 9 illustrates one such HTML Web page in which a scroll box exists for the user to select a vehicle make 400. FIG. 9 is shown by way of example only, and it is noted that more than one Web page could be used for the functions illustrated in FIG. 9 and any form for this page known to those skilled in the art could be used. After the user selects a make 400 of vehicle, that information may be uploaded to the server 10, which is denoted as block 314 in FIG. 8. FIG. 6a denotes this interaction between the client 12 and the server 10 by the uploading of a desired subset 102 to the server 10. After the user selects a make 400 of vehicle and this information is uploaded to the server 10, the server 10 may send another set of subset choices 100 to the client 12 so that the user may select a series of car. FIG. 6a depicts the transfer of these subset choices 100 from the server 10 to the client 12.

The user may then select a series of vehicle, as shown in scroll box 402 in FIG. 9 and block 316 in FIG. 8. A similar procedure is then followed as when a make of vehicle was selected by the user. The desired subset 102 is uploaded to the server 10, as shown in block 318 in FIG. 8. The server 10, in turn, may then download additional subset choices 100 to the client 12, as shown in FIG. 6a. Similarly, the user may then select a model of vehicle, as shown in scroll box 404 in FIG. 9 and block 320 in FIG. 8. This desired subset 102 may then be uploaded to the server 10, as shown in FIG. 6a and by block 322 in FIG. 8. In this manner, the user narrows the possible product configurations such that, upon receiving the subset choices 100 (or initial product configuration data) the server 10 may allocate and download an appropriate limited configuration engine 40 to the client 12.

Block 324 in FIG. 8 depicts the process in which the user may select a variety of options for the chosen make/series/model of vehicle selected. In order to present these option attributes to the user on the client 12, the limited configuration engine 40 corresponding to the make/series/model is downloaded to the client 12, which is depicted as numeral 104 in FIG. 6a. As previously stated, the limited configuration engine 40 downloaded from the server 10 to the client 12 is a limited version of the full configuration engine 52 on the server 10 corresponding to the particular make/series/model of the vehicle selected for configuration. In one embodiment, this limited configuration engine 40 presents a full set of the option attributes to the user on the client 12, but does not contain a full set of the option rules that exist on the server 10. Because there are a large number of option rules and interrelationships between option attributes for vehicle configurations, a full set of these option rules remains on the server 10, where a full and final check of the viability of the desired configuration may be performed. In one embodiment, as the user selects option attributes, the price of the vehicle configuration may be dynamically updated to reflect an approximate price of the vehicle as configured.

FIG. 10 shows one potential embodiment of an HTML Web page which may be presented to the user for selecting option attributes (block 324 in FIG. 8), although any page known to those skilled in the art may be presented to the user for this purpose. A number of option attributes 500, 502, 504, such as the type of engine, axles, and other vehicle option packages, may be presented for the user's choice. FIG. 10 also shows the price 506 which may be listed for each option attribute. As previously described in connection with the invention, the limited configuration engine 40 and the Java, ActiveX, JavaScript, Helper-Viewer, or other plug-ins or client-side programs 50 on the client 12 may perform a limited check on the viability of a desired configuration as the user enters or chooses option attributes. For example, certain option attributes 46 may be automatically selected or made not available for selection upon the selection of other option attributes 46 by the user. When the user completes the desired configuration, the user may click on the "submit" or "next" button, which uploads the desired configuration from the client 12 to the server 10. This act of uploading the desired configuration 106 is shown in FIG. 6a and is depicted as block 326 in FIG. 8.

The server 10 performs a check on the viability of the desired configuration using the full configuration engine 52. As indicated above, this full configuration engine 52 on the server 10 contains more detailed option rules 66 and full configuration programs 68 to check the viability of the desired configuration. If the desired configuration is viable, the server 10 may download another limited configuration engine 40 to the client 12 so that the user may select the desired color scheme for the vehicle, as indicated in block 330 in FIG. 8. In one embodiment, this color selection page may be combined with the option selection page at block 324 of FIG. 8. In this embodiment, a separate page for the selection of a color scheme may not be necessary. In another embodiment, this color selection page may be a separate HTML form for which a separate process of uploading a desired color scheme to the server 10 may be necessary, which is indicated on FIG. 8 as block 332.

If the desired configuration is viable, i.e., if the selected option attributes in the desired configuration may be combined to form a valid vehicle configuration, the server 10 may download to the client 12 an order report 112 summarizing the selected configuration and/or a document detailing the viability of the desired configuration. If the desired configuration is not viable, i.e., where the full option rules are not met and option attributes must therefore be changed to build a viable configuration, the document detailing the viability of the desired configuration may be a version of the HTML form used for option selection (as shown in FIG. 10), with certain options highlighted or with explanations as to the necessity to change certain option attributes. A limited configuration engine 40, which may be similar to that transmitted to the client 12 as numeral 104 in FIG. 6*a*, may also be downloaded to the client 12 as part of the viability of the configuration 108 to allow the user to refine the vehicle configuration. In this manner, further configuration tools, such as additional limited option attributes 46 and limited option rules 47, may be allocated and downloaded from the server 10 to the client 12 if a desired configuration is not viable.

This process of uploading a desired configuration (numeral 106 in FIG. 6*a*) from the client 12 to the server 10 and downloading the viability status of the configuration and tools for resolving open viability issues (numeral 108 in FIG. 6*a*) may be repeated until a viable configuration has been assembled and an order report 112 summarizing that configuration may be downloaded to the client 12. Block 334 of FIG. 8 and numeral 112 in FIG. 6*a* represent this order report which is downloaded from the server 10 to the client 12. Such an order report or configuration summary may appear similar to the configuration summary depicted as FIG. 11. FIG. 11 shows a Web page illustrating a configuration summary and containing a total invoice price 600, the make, model, and series of car 602, as well as a summary of the optional equipment 604 (option attributes) for the vehicle. This Web page may be a one-page summary or a multi-page summary showing the options for the vehicle configuration.

FIG. 8 also depicts as block 306 the possibility that pre-configured vehicles may be used to aid in the configuration process, which is shown in FIG. 6*b* for a general product configuration embodiment. A user, for example, may have one or more configurations that he or she commonly uses. These configurations may be saved (on either the client 12 or the server 10) to be used later. In one embodiment, each time a user configures a vehicle, that configuration may be saved for later use. Starting a configuration session with a pre-configured or partially pre-configured vehicle may simplify the configuration process. FIG. 8 illustrates one scenario where the pre-configured information consists of the make/model/series information for the vehicle, but the user still selects the options for that give make/model/series. A second scenario shown in FIG. 8 depicts the possibility that the options are also pre-configured for the vehicle, so that only the color scheme must be selected by the user during a configuration session.

After a configuration session has been completed and a viable configuration has been assembled, an order may be sent from the server 10 to the vehicle manufacturer or vehicle dealer to order the vehicle. This order is represented by numeral 114 in FIG. 6*a*, FIG. 6*b*, and FIG. 6*c*.

d. SUMMARY

The present invention provides methods and systems for computerized configurations in network systems containing one or more servers 10 and one or more clients 12. The methods and systems allocate the load between the server-side and the client-side of such a network and reduce the amount of time spent uploading or downloading information between the client 12 and the server 10. The systems and methods utilize existing computer systems and software packages. The methods and systems accomplish these tasks by sending only a limited configuration engine 40 from the server 10 to the client 12 to perform a discrete amount of logic on the client 12. The user's interaction with the client 12, which may be through an HTML Web page using client-side programs 50, will not require communication with the server 10 while the user enters configuration options and limited logic is performed on those options. Because only a limited configuration engine 40 is sent from the server 10 to the client 12, a final check on the viability of the desired configuration may be performed on the server 10 after a desired configuration is uploaded to the server 10 from the client 12.

The methods and systems of the present invention are particularly useful for technical and complex configurations, such as vehicle or computer configurations, where a large number of option attributes exist and a large number of option rules and interrelationships exist between options. For such systems, it may be unpractical to transmit the full logic of the configuration system from the server 10 to the client 12, yet it may be undesirable to have repeated communications with the network as associated with common server-side systems. The methods and systems of the present invention aid in the allocation of data and information between the server 10 and the client 12, so that only a limited amount of information and data will be downloaded to the client 12 from the server 10. The full data and information is retained on the server 10 for a final check on the viability of desired configurations.

While the present invention has been described with reference to several embodiments thereof, those skilled in the art will recognize various changes that may be made without departing from the spirit and scope of the claimed invention. Accordingly, this invention is not limited to what is shown in the drawings and described in the specification but only as indicated in the appended claims. Any numbering or ordering of elements in the following claims is merely for convenience and is not intended to suggest that the ordering of the elements of the claims has any particular significance other than that otherwise expressed by the language of the claims.

What is claimed is:

1. In a computer network having at least one server connectable to at least one client, including a full set of configuration programs and a full set of configuration information, having a full set of option rules relating to a set of products, a method for creating technical configurations and electronically delivering order reports to at least one client, the method comprising:

receiving on-line from a user on the client a selection of a desired product selected from the set of products, wherein the selection represents initial product configuration data of the desired product;

downloading to the client from the server only limited configuration information that is a subset of the full set of configuration information and limited configuration programs that are a subset of the full configuration programs, the limited configuration information including option attributes of the desired product and limited option rules that define relationships therebetween, wherein the limited configuration information and limited configuration programs are determined at the server based on the initial product configuration data of the desired product, and wherein the limited configuration information and the limited configuration programs are downloaded to the client responsive to the user selection;

requesting a desired technical configuration of the desired product from the user on the client, wherein selections for the option attributes of the desired product are elicited from the user;

preliminarily checking the viability of the desired technical configuration of the desired product at the client, wherein the limited configuration programs verify conformity of the user selections for the option attributes with the limited option rules;

receiving at the server the desired technical configuration from the client subsequent to preliminarily checking the viability of the desired technical configuration;

performing a full check at the server on the viability of the desired technical configuration, wherein the full set of configuration programs verify conformity of the user selections for the option attributes with the full set of option rules;

preparing and transmitting to the client an electronic order report, if the full check at the server is successful; and downloading to the client from the server additional option rules that are a subset of the full set of option rules and receiving from the client at the server a second desired technical configuration developed on the client and verified on the client for conformity with the additional option rules, if the full check at the server is not successful.

2. The method of claim 1 further comprising using a TCP/IP connection to pass an HTTP request from the client to the server.

3. The method of claim 1 wherein the limited configuration information comprises limited option attributes and limited option rules.

4. The method of claim 1 wherein the limited configuration programs comprise an HTML page and client-side programs.

5. The method of claim 4 wherein the client-side programs comprise a plug-in or helper-application.

6. The method of claim 4 wherein the client-side programs include one or more programs selected from lava, JavaScipt, ActiveX, and Helper-Viewer.

7. The method of claim 4 wherein the client-side programs are cached on the client.

8. The method of claim 7 wherein the client-side programs are cached in client-side memory.

9. The method of claim 7 wherein the client-side programs are cached on client-side disk storage.

10. The method of claim 1 wherein the act of performing a full check comprises executing a CGI script on the server.

11. The method of claim 1 further comprising:
downloading to the client additional limited configuration information, wherein the additional limited configuration information is a subset of the full set of configuration information and includes the additional option rules; and wherein the second desired technical configuration is verified on the client for conformity with the additional limited configuration information, if the full check at the server is not successful.

12. The method of claim 1 wherein the act of requesting a desired technical configuration further comprises enabling the user to specify whether an exact match or a loose match is desired between the desired technical configuration and a viable configuration.

13. The method of claim 1 wherein the act of requesting a desired technical configuration further comprises using templates of pre-configured information.

14. The method of claim 1 wherein requesting a desired technical configuration includes requesting at least one of the group consisting of: a vehicle make, a vehicle model, and a vehicle series.

15. The method of claim 14 wherein the desired technical configuration is a vehicle configuration.

16. A method for generating an order for a vehicle on a network-based computer system including a server and a client, the server including a full configuration engine including software, a full set of option attributes, and a full set of option rules relating to each of a plurality of vehicles, the method comprising:
receiving on-line from a user on the client an identification of a desired vehicle, wherein the identification represents initial desired vehicle configuration data;

transmitting only a limited configuration engine to the client in response to the identification, the limited configuration engine corresponding to the desired vehicle and including a limited set of option attributes of the desired vehicle and a limited set of option rules that define relationships therebetween, wherein the limited set of option attributes is a subset of the full set of option attributes and the limited set of option rules is a subset of the full set of option rules, and wherein the limited configuration engine is determined at the server based on the initial desired vehicle configuration data;

requesting a vehicle configuration of the desired vehicle from the user, wherein selections for the limited set of option attributes of the desired vehicle are elicited from the user;

preliminarily checking the viability of the vehicle configuration of the desired vehicle at the client, wherein the client verifies the conformity of the user selections for the limited set of option attributes with the limited set of option rules;

receiving on-line at the server the vehicle configuration from the client subsequent to preliminarily checking the viability of the vehicle configuration;

performing a full viability check of the vehicle configuration at the server, wherein the software of the full configuration engine verifies conformity of the user selections for the limited set of option attributes with the full set of option rules;

sending an order report from the server to the client summarizing the vehicle configuration to the client, if the full viability check at the server is successful; and downloading to the client from the server additional option rules that are a subset of the full set of option rules and receiving from the client at the server a second vehicle configuration developed on the client and verified on the client for conformity with the additional option rules, if the full viability check at the server is not successful.

17. The method of claim 16 wherein the limited engine includes limited software and a limited set of option attributes.

18. The method of claim 16 further including, after performing the full viability check, communicating at least one problem with the vehicle configuration to the client.

19. The method of claim 18 wherein the at least one problem is displayed on the client in an HTML web page.

20. The method of claim 16 wherein, if the full viability check is unsuccessful, the server transmits an updated limited configuration engine to the client, the updated limited configuration engine including the additional option rules.

21. The method of claim 16 further comprising transmitting an updated limited configuration engine to the client, where the vehicle configuration failed to pass the final viability check.

22. The method of claim 21 wherein the client has performed a second viability check of the second vehicle configuration, using the updated limited configuration engine.

23. The method of claim 16 wherein the receiving an identification of the desired vehicle comprises:
receiving on-line a vehicle make from the client;
sending on-line a set of vehicle models to the client, the vehicle models corresponding to the vehicle make; and
receiving on-line a vehicle model from the client, the vehicle model chosen from the set of vehicle models.

24. The method of claim 16 wherein the limited configuration engine includes an HTML web page and client-side programs.

25. The method of claim 24 wherein the client-side programs include a plug-in or helper-application.

26. The method of claim 24 wherein the client-side programs include one or more programs selected from the group consisting of: Java, JavaScript, ActiveX, and Helper-Viewer.

27. A method for generating an order for a vehicle on a network-based computer system including a server in communication with a client, the server including a full configuration engine including software, a full set of option attributes, and a full set of option rules relating to each of a plurality of vehicles, the method comprising:

receiving at the server an identification of a desired vehicle, wherein the identification represents initial desired vehicle configuration data;

transmitting only a limited configuration engine from the server in response to the identification, the limited configuration engine corresponding to the desired vehicle and including a limited set of option attributes of the desired vehicle and a limited set of option rules that define relationships therebetween, wherein the limited set of option attributes is a subset of the full set of option attributes and the limited set of option rules is a subset of the full set of option rules, and wherein the limited configuration engine is determined at the server based on the initial desired vehicle configuration data;

receiving at the server a vehicle configuration of the desired vehicle, including selections for the limited set of option attributes, wherein the vehicle configuration received at the server has been preliminarily checked for viability to verify the conformity of the limited set of option attributes with the limited set of option rules;

performing a full viability check of the vehicle configuration at the server, wherein the software of the full configuration engine verifies conformity of the limited set of option attributes with the full set of option rules;

sending an order report from the server summarizing the vehicle configuration, if the full viability check at the server is successful; and transmitting from the server additional option rules that are a subset of the full set of option rules and receiving at the server a second vehicle configuration that has been verified for conformity with the additional option rules, if the full viability check at the server is not successful.

* * * * *

UNITED STATES PATENT AND TRADEMARK OFFICE
CERTIFICATE OF CORRECTION

PATENT NO.       : 7,003,548 B1
APPLICATION NO.  : 09/280609
DATED            : February 21, 2006
INVENTOR(S)      : David Barck It is certified that error appears in the above-identified patent and that said Letters Patent is hereby corrected as shown below:

In Column 21, Line 49, please delete "Lava" and insert --Java--

In Column 21, Line 50, please delete "JavaScipt" and insert -- JavaScript--

Signed and Sealed this

First Day of August, 2006

JON W. DUDAS
*Director of the United States Patent and Trademark Office*